A. MEHLFELDER.
MECHANISM FOR INTERMITTENT MOTION.
APPLICATION FILED MAR. 23, 1914.
1,164,377. Patented Dec. 14, 1915.
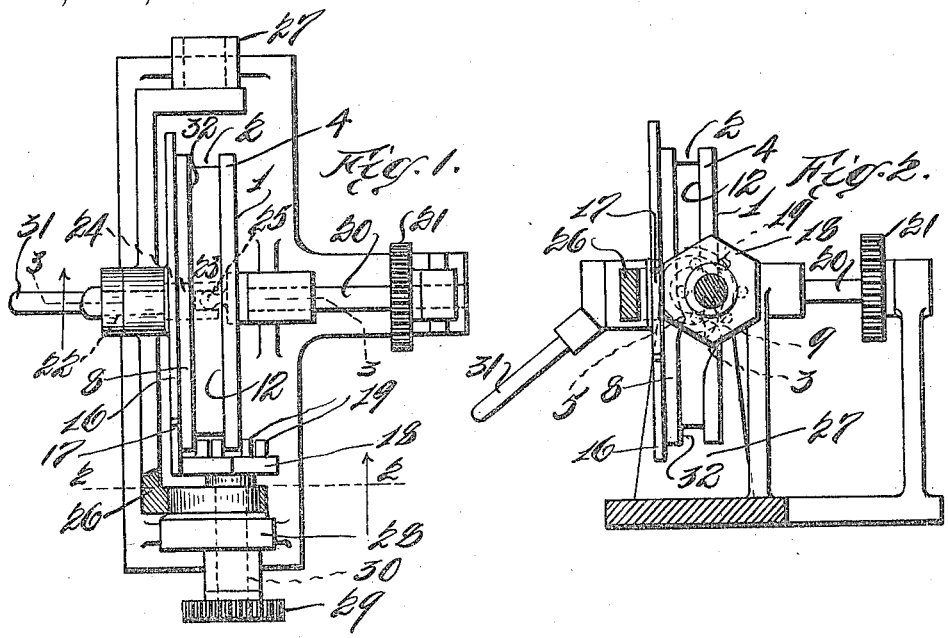

UNITED STATES PATENT OFFICE.

ANTON MEHLFELDER, OF NEW YORK, N. Y., ASSIGNOR, BY MESNE ASSIGNMENTS, TO HERMAN REHER, OF NEW YORK, N. Y.

MECHANISM FOR INTERMITTENT MOTION.

1,164,377. Specification of Letters Patent. Patented Dec. 14, 1915.

Application filed March 23, 1914. Serial No. 826,524.

*To all whom it may concern:*

Be it known that I, ANTON MEHLFELDER, a citizen of the United States, residing at New York city, county and State of New York, have invented certain new and useful Improvements in Mechanism for Intermittent Motion, of which the following is a clear, full, and exact description.

This invention relates to an intermittent movement adapted for use in connection with motion picture devices or for any other purpose requiring a step by step movement transformed by special mechanism from a constant rotary motion.

The chief object of the invention is to provide a device that will transform a constant rotary movement into an intermittent movement without the production of noise or rattle. To accomplish this result, I employ a driven disk having a plurality of projecting points, preferably six, which engage a cam slot in a continuously rotating disk.

The invention will be specifically pointed out in the following specification and claims.

In the drawing: Figure 1 is a top plan view of an embodiment of my invention. Fig. 2 is a cross-sectional view thereof, the section being taken on a line 2—2 in Fig. 1. Fig. 3 is a fragmentary cross-sectional view, the section being taken on a line 3—3 in Fig. 1. Figs. 4 and 5 are diagrammatic fragmentary views illustrating the manner of rotating the driven disk step by step.

As herein embodied my invention consists of a cam in the form of a disk 1, provided with an annular groove 2 communicating with an opening or outlet 3 in the flange 4 of the disk 1. Opposite the opening 3 I locate a cam spot 5 having curved walls 6 and 7; the spot 5 is made, in this instance, integral with the shoulder 8 of the disk 1. To coöperate with the cam spot 5, to produce the step by step movement, I provide a cam spot 9 and locate same in the opening 3. The cam spot 9 is provided with curved walls 10 and 11 alining substantially with the wall 12 of the flange 4, and an outer curved wall 13 which divides the opening 3 into channels 14 and 15. The disk 1 is further provided with a flange 16 having an opening 17, the flange 16 extending beyond the peripheral surface of the shoulder 8. The function of the flange 16 will be hereinafter described.

The function of the cam 1 is to rotate a hexagonal disk 18 provided with, in this instance, six equally spaced points or pins 19. The pins 19 are adapted to ride in the groove 2 of the cam 1 and to be impinged upon by the cam spots 5 and 9, whereby the disk 18 is partly rotated for every revolution of the cam 1. To rotate the cam 1 I provide a driving shaft 20 which is continuously rotated by any means not shown. In this instance I provide the shaft 20 with a gear 21 which can be operated in any desirable manner. The disk 1 is secured to a driven shaft 22 connected to the driving shaft 20 by a universal connection 23 consisting of a jaw member 24 carried by the shaft 22 and a rounded stud member 25 engaging the jaw member 24.

A further feature of the device consists of the ability to rotatably advance or retard the driven disk 18. To accomplish this result I mount the shaft 22 in a swivel frame 26 pivoted in brackets 27 and 28. The axis of the pivotal connection of the bracket is coincident with the axes of the shafts 20 and 22 when said shafts are alined; hence the frame 26 can be swung upon its pivots without placing any torsional strain upon the universal connection 23. The movement of the disk 18 is imparted to any suitable mechanism by means of a gear 29 mounted upon the shaft 30 for the disk 18. The frame 26 is provided with a handle 31 by which means it can be manipulated. The function of the flange 16 is to lock the disk 18 when said disk is stationary, the opening 17 in said flange being provided for the purpose of permitting the disk 18 to be turned, the said opening being located opposite the cam spots 5 and 9.

It will be seen by referring to Figs. 4 and 5 that there will always be three of the pins 19 in the groove 2, two of said pins being in contact with the wall 12 of the flange 4, and the third in contact with the wall 32 of the shoulder 8. It is obvious that when those pins which are riding in the groove 2 contact with the curved walls of the cam spots 5 and 9 there will be no appreciable resulting sound for the reason that the said spots will merely ride into contact and not strike. Furthermore as the curved wall 10 of the spot 9 will be the first to contact with a pin the disk 18 will be started and in motion when the wall 6 of the spot 5 contacts with its adjacent pin to impart to the disk the final movement. When the wall 15 strikes its pin indicated by A, Fig. 4, the disk will be moved slightly in the direction of the arrow 33, causing the pin B to move upwardly and causing the pins C and D to pass into the channels 15 and 14 respectively. When the cam 8 has moved to the position shown in Fig. 5, the disk 18 will have had imparted to it one-sixth of a revolution, spot 6 in the meantime having impinged upon the pin B, forcing it upwardly to a position in alinement with the wall 12 of the flange 4. For the reason that some of the pins are always in contact with the inner walls of the groove, and at no time is there any space or slack between the said inner surface and any of the pins makes it possible to transform a constant rotary movement into an intermittent rotary movement.

I claim as my invention:

1. The herein described mechanism for intermittent motion, consisting of a continuously rotated shaft, a universal joint, a shaft connected with the first shaft by said joint, said second shaft carrying a cam, an intermittent shaft having a plurality of studs to be engaged by said cam, locking sides adjacent said studs, and a locking device carried by the cam adapted to permit rotation of the intermittent shaft only at a given time.

2. The herein described mechanism for intermittent motion, consisting of a continuously rotated shaft, a universal joint, a shaft connected with the first shaft by said joint, said second shaft carrying a cam, an intermittent shaft having a plurality of studs to be engaged by said cam, locking sides adjacent said studs, and a locking device carried by the cam adapted to permit rotation of the intermittent shaft only at a given time, and means for shifting the cam on its universal joint.

3. The herein described mechanism for intermittent motion, consisting of a continuously rotated shaft, a universal joint, a shaft connected with the first shaft by said joint, said second shaft carrying a cam, an intermittent shaft having a plurality of studs to be engaged by said cam, locking sides adjacent said studs, and a locking device carried by the cam adapted to permit rotation of the intermittent shaft only at a given time, there being six studs controlling the operation of the intermittent shaft, at least three engaging a single cam groove at a time.

4. The herein described mechanism for intermittent motion, consisting of a continuously rotated shaft, a universal joint, a shaft connected with the first shaft by said joint, said second shaft carrying a cam, an intermittent shaft having a plurality of studs to be engaged by said cam, locking sides adjacent said studs, and a locking device carried by the cam adapted to permit rotation of the intermittent shaft only at a given time, the cam having a circular peripheral groove.

5. The herein described mechanism for intermittent motion, consisting of a continuously rotated shaft, a universal joint, a shaft connected with the first shaft by said joint, said second shaft carrying a cam, an intermittent shaft having a plurality of studs to be engaged by said cam, locking sides adjacent said studs, and a locking device carried by the cam adapted to permit rotation of the intermittent shaft only at a given time, and means for shifting the cam on its universal joint, the cam having a circular peripheral groove.

6. The herein described mechanism for intermittent motion, consisting of a continuously rotated shaft, a universal joint, a shaft connected with the first shaft by said joint, said second shaft carrying a cam, an intermittent shaft having a plurality of studs to be engaged by said cam, locking sides adjacent said studs, and a locking device carried by the cam adapted to permit rotation of the intermittent shaft only at a given time, there being six studs controlling the operation of the intermittent shaft, at least three engaging a single cam groove at a time, the cam having a circular peripheral groove.

7. The herein described mechanism, consisting of a cam, a universal joint and a shaft for rotating said cam through said universal joint, means for shifting the cam, the cam having a peripheral groove with an opening in the side, and a crescent shaped cam stud 9 in said opening, in combination with an intermittent shaft carrying a plurality of studs engaging the cam groove.

8. The herein described mechanism, consisting of a cam, a universal joint and a shaft for rotating said cam through said universal joint, means for shifting the cam, the cam having a peripheral groove with an opening in the side, and a crescent shaped cam stud 9 in said opening, in combination with an intermittent shaft carrying a plurality of studs engaging the cam groove, at least three studs engaging the cam groove at a given time.

9. The herein described mechanism consisting of a cam, a universal joint and a shaft for rotating said cam through said universal joint, means for shifting the cam, the cam having a peripheral groove with an opening in the side and a crescent shaped cam stud 9 in said opening, in combination with an intermittent shaft carrying a plurality of studs engaging the cam groove, there being six studs, two engaging the outer side of the cam, two engaging one wall of the cam groove, one engaging the opposite wall, and one stud at all times free from the cam.

10. The herein described mechanism, consisting of a cam, a universal joint and a shaft for rotating said cam through said universal joint, means for shifting the cam, the cam having a peripheral groove with an opening in the side, and a crescent shaped cam stud 9 in said opening, in combination with an intermittent shaft carrying a plurality of studs engaging the cam groove, in combination with a registering locking means adapted to prevent motion on the part of the intermittent shaft, except when the studs are in condition to pass through the cam groove.

11. The herein described mechanism consisting of a cam and a shaft for rotating said cam, means for shifting said cam, the cam having a peripheral groove with an opening in the side, and an intermittent shaft carrying a plurality of studs to engage the peripheral groove of the cam.

Signed at New York city, New York, this 20th day of March, 1914.

ANTON MEHLFELDER.

Witnesses:
MICHAEL SEGEL,
JOHN H. KLATTHAAR.

Copies of this patent may be obtained for five cents each, by addressing the "Commissioner of Patents, Washington, D. C."